United States Patent
Liu et al.

(10) Patent No.: US 10,433,341 B2
(45) Date of Patent: Oct. 1, 2019

(54) RANDOM ACCESS RESPONSE MESSAGE SENDING METHOD AND NODE

(71) Applicant: ZTE CORPORATION, Shenzhen (CN)

(72) Inventors: Kun Liu, Shenzhen (CN); Bo Dai, Shenzhen (CN); Zhaohua Lu, Shenzhen (CN); Shuqiang Xia, Shenzhen (CN); Xianming Chen, Shenzhen (CN); Jing Shi, Shenzhen (CN); Huiying Fang, Shenzhen (CN)

(73) Assignee: ZTE CORPORATION (CN)

( * ) Notice: Subject to any disclaimer, the term of this patent is extended or adjusted under 35 U.S.C. 154(b) by 7 days.

(21) Appl. No.: 15/546,378

(22) PCT Filed: Jan. 12, 2016

(86) PCT No.: PCT/CN2016/070715
§ 371 (c)(1),
(2) Date: Jul. 26, 2017

(87) PCT Pub. No.: WO2016/119591
PCT Pub. Date: Aug. 4, 2016

(65) Prior Publication Data
US 2017/0374689 A1    Dec. 28, 2017

(30) Foreign Application Priority Data
Jan. 29, 2015    (CN) .......................... 2015 1 0047637

(51) Int. Cl.
*H04L 5/14*    (2006.01)
*H04W 84/18*    (2009.01)
(Continued)

(52) U.S. Cl.
CPC ...... *H04W 74/0833* (2013.01); *H04W 72/042* (2013.01); *H04W 72/0453* (2013.01); *H04W 76/27* (2018.02); *Y02D 70/00* (2018.01)

(58) Field of Classification Search
CPC .......................... H04W 74/0833; H04W 76/11; H04W 72/042
See application file for complete search history.

(56) References Cited

U.S. PATENT DOCUMENTS

2010/0002590 A1* 1/2010 Park .................... H04W 74/006
370/241
2012/0257559 A1* 10/2012 Kim ...................... H04W 76/19
370/311
(Continued)

FOREIGN PATENT DOCUMENTS

CN    102291846 A    12/2011
CN    103929826 A     7/2014
(Continued)

OTHER PUBLICATIONS

Random Access Method and System for Realizing Random Access, (WO2011160579(A1), Pbulication Date, Dec. 29, 2011.*
(Continued)

*Primary Examiner* — Brian S Roberts
*Assistant Examiner* — Abusayeed M Haque
(74) *Attorney, Agent, or Firm* — McDonald Hopkins LLC

(57) ABSTRACT

The document discloses a method for sending a Random Access Response (RAR) message and a node. The method includes: a first type node sends an RAR through a downlink channel, and the RAR carries one or more pieces of RAR information of a second type node.

19 Claims, 4 Drawing Sheets

(51) Int. Cl.
*H04W 74/08* (2009.01)
*H04W 72/04* (2009.01)
*H04W 76/27* (2018.01)

(56) References Cited

U.S. PATENT DOCUMENTS

| | | | |
|---|---|---|---|
| 2012/0300728 A1* | 11/2012 | Lee, II | H04J 13/16 370/329 |
| 2013/0021984 A1* | 1/2013 | Han | H04W 74/006 370/329 |
| 2013/0070696 A1* | 3/2013 | Tang | H04W 52/146 370/329 |
| 2016/0088660 A1 | 3/2016 | Liu et al. | |
| 2016/0192420 A1* | 6/2016 | Kim | H04W 74/00 370/329 |
| 2016/0219622 A1 | 7/2016 | Liu et al. | |

FOREIGN PATENT DOCUMENTS

| | | |
|---|---|---|
| CN | 104144517 A | 11/2014 |
| WO | 2014177092 A1 | 11/2014 |

OTHER PUBLICATIONS

Random Access Method and System for Realizing Random Access, (WO 2011160579(A1)),Publication number Dec. 29, 2011 (Year: 2011).*
PCT International Search Report dated Apr. 12, 2016, Application No. PCT/CN2016/070715, 3 Pages.
PCT International Search Report Application No. PCT/CN2016/070715 dated Apr. 12, 2016, English Translation.
CN102291846A, Abstract & Machine Translation.
CN103929826A, Abstract.
CN104144517, US 2016/0088660 A1.
WO2014177092A1, US 2016/0219622 A1.

* cited by examiner

RANDOM ACCESS RESPONSE MESSAGE SENDING METHOD AND NODE

TECHNICAL FIELD

The present disclosure relates to, but not limited to, the field of communications.

BACKGROUND

Machine Type Communication User Equipment (MTC UE) is also referred to as Machine-to-Machine (M2M) user communication equipment, and is a main application form of the current internet of things. Low power consumption and low cost are important guarantees for large-scale application thereof. The M2M equipment currently deployed on the market is mainly based on a Global System of Mobile communication (GSM) system. Recently, due to the improvement of the spectrum efficiency of Long Term Evolution (LTE)/Long Term Evolution-Advanced (LTE-A), more and more mobile operators select LTE/LTE-A as an evolution direction of a future broadband wireless communication system. M2M multi-type data services based on LTE/LTE-A will be more attractive. Only when the cost of LTE-M2M equipment is lower than that of the MTC UE of the GSM system, M2M services will be really turned from the GSM system to an LTE system.

Main alternative methods for reducing the cost of the MTC UE in the existing art includes: reducing the number of receiving antennae of the UE, reducing the baseband processing bandwidth of the UE, reducing the peak rate supported by the UE, adopting a half-duplex mode, and the like. However, cost reduction means performance reduction, and demands for cell coverage of the LTE/LTE-A system cannot be reduced. Therefore, when the MTC UE configured with a low cost is adopted, some measures need to be taken to meet coverage performance demands of LTE UE. In addition, the MTC UE is probably located at a position such as a basement and a corner, and the scenario is worse than a scenario where a common LTE UE is located. To make up coverage reduction caused by a penetration loss, some of MTC UEs need a higher performance, and therefore it is necessary to perform uplink/downlink Coverage Enhancement (CE) on some of the MTC UEs for this scenario. How to ensure the access quality of a user is a problem required to be taken into first consideration, and it is necessary to perform enhanced design on a Physical Random Access Channel (PRACH) of the LTE/LTE-A system, to ensure that the MTC UE can normally access the system.

In the LTE/LTE-A system, after sending a random access Preamble on the PRACH, the UE will receive a Random Access Response (RAR) message sent by an evolved Node B (eNB). Scheduling information of the RAR is contained in Downlink Control Information (DCI) and sent through a Physical Downlink Control Channel (PDCCH), herein the DCI further includes a 16-bit Cyclic Redundancy Check (CRC), and the CRC is scrambled by a 16-bit Random Access Radio Network Temporary Identity (RA-RNTI). The scrambling manner is as follows:

$$c_k = (b_k + a_k) \mod 2 \; k=0,1,\ldots,15,$$

herein $b_k$ represents a $(k+1)^{th}$ bit in the CRC; $a_k$ represents a $(k+1)^{th}$ bit in the RA-RNTI; and $c_k$ represents a $(k+1)^{th}$ bit generated after scrambling.

The value of the RA-RNTI is determined by a PRACH occupied by the Preamble sent by the UE through the following formula:

$$RA\_RNTI = 1 + t\_id + 10 * f\_id,$$

herein $t\_id$ ($0 \leq t\_id < 10$) represents an index of a subframe where a first PRACH occupied by the Preamble sent by the UE is located; and $f\_id$ represents a frequency domain resource index, allocated to the UE for sending the PRACH, in the subframe indicated by $t\_id$ (arranged in an ascending order and $0 \leq f\_id < 6$).

The UE receives the RAR message and obtains uplink time synchronization.

SUMMARY

The following is a summary for a subject described herein in detail. The summary is not intended to limit the scope of protection of claims.

Due to enhanced design on a PRACH of an LTE/LTE-A system to ensure that an MTC UE can normally access the system, an RAR of the LTE/LTE-A system also needs an enhanced design, thus ensuring that the MTC UE can normally receive the RAR.

A method for sending an RAR message and a node are provided in the document to solve the problem about enhanced design on an RAR.

The method for sending an RAR message includes that:
a first type node sends an RAR message through a downlink channel, herein the RAR carries one or more pieces of RAR information of a second type node.

In an exemplary embodiment, before the step that a first type node sends an RAR message through a downlink channel, the method further includes that:
the first type node receives a random access signaling sent by the second type node.

In an exemplary embodiment, the method further includes: scheduling information of the RAR is contained in DCI and is sent through a PDCCH and/or an Enhanced-PDCCH (EPDCCH).

In an exemplary embodiment, the scheduling information of the RAR includes resource allocation information about RAR information of N levels of second type nodes in the RAR, herein N is greater than or equal to 1.

In an exemplary embodiment, the resource allocation information is indicated by first index information, and the first index information is expressed by K bits, and K is greater than or equal to 1.

In an exemplary embodiment, any one or more pieces of the following information are indicated through the first index information:
level quantity information of the second type nodes to which RAR information sent in the RAR belongs,
level index information of the second type nodes to which RAR information sent in the RAR belongs,
quantity information of RAR information supported and sent to each level of second type node in the RAR, and
ratio information of the quantity of RAR information supported and sent to each level of second type node in the RAR to a quantity of RAR information that can be totally supported in the RAR.

In an exemplary embodiment, the RAR information of the second type node includes level information of the second type node.

In an exemplary embodiment, the method further includes that:
the first type node sends Backoff Indicator (BI) index information to the second type node.

In an exemplary embodiment, the BI index information is sent in the RAR.

In an exemplary embodiment, the method further includes: the second type node obtains a first Backoff Parameter (BP) according to the BI index information, herein a mapping relation between the BI index information and the first BP is configured by standard default.

In an exemplary embodiment, the method further includes: the second type node determines a second BP according to any one of the following expressions:

second BP=first BP×$A$×$B$, second BP=first BP×$A$, second BP=first BP×$B$, and second BP=first BP, herein there is a mapping relation between a value of A and a level of the second type node; and B is a repetition quantity of sending random access Preamble through the second type node at a latest time, or a quantity of subframes occupied by sending random access Preamble through the second type node at the latest time, or time corresponding to subframes occupied by sending random access Preamble through the second type node at the latest time, or a repetition quantity of sending random access Preamble through the second type node, or a quantity of subframes occupied by sending random access Preamble through the second type node, or time corresponding to subframes occupied by sending random access Preamble through the second type node.

In an exemplary embodiment, when the RAR carries only one piece of RAR information of the second type node, the BI index information is indicated in System Information (SI).

In an exemplary embodiment, the BI index information is sent by the first type node through a message, and scheduling information of the message is contained in DCI and sent through a PDCCH and/or an EPDCCH.

In an exemplary embodiment, the DCI further includes a CRC, and the CRC is scrambled by a BI Radio Network Temporary Identity (BI-RNTI).

In an exemplary embodiment, the BI index information is contained in DCI and sent through a PDCCH and/or an EPDCCH.

In an exemplary embodiment, the DCI further includes a CRC, and the CRC is scrambled by a BI-RNTI.

In an exemplary embodiment, the RAR carries only one piece of RAR information of the second type node.

In an exemplary embodiment, the method further includes that:

a mapping table between BI index information and a BP is pre-defined, herein mapping tables corresponding to different levels are different.

In an exemplary embodiment, the method further includes: the second type node selects a corresponding mapping table according to the level information, and obtains a corresponding BP in the selected mapping table according to the BI index information.

In an exemplary embodiment, mapping relations between BI index information and BPs of different levels of second type nodes are pre-defined in the same mapping table.

In an exemplary embodiment, value ranges of BI index information of the different levels of second type nodes are informed by the first type node or determined in a pre-defined manner.

In an exemplary embodiment, there is an intersection between the value ranges of the BI index information of the different levels of second type nodes.

In an exemplary embodiment, the RAR information of the second type node includes Uplink Delay (UL Delay) information of the second type node, and the method further includes:

the second type node determines, according to the UL Delay information, whether to delay sending a Msg3 message.

In an exemplary embodiment, the method further includes: when the UL Delay information is indicative of delaying sending the Msg3 message, the second type node determines a delay time T for sending the Msg3 message according to the following expression:

$T=D$, herein there is a mapping relation between a value of D and a level of the second type node, and the value of D is determined according to a repetition quantity of sending Physical Uplink Shared Channel (PUSCH) of the second type node, and the measuring unit of D is Subframe or Frame.

In an exemplary embodiment, the method further includes that:

a mapping table between UL Delay information and a sending delay time T is pre-defined, herein mapping tables corresponding to different levels are different; and the second type node selects a corresponding mapping table according to the level information, and then obtains the sending delay time T in the selected mapping table according to the UL Delay information.

In an exemplary embodiment, when the sending delay time T obtained by the second type node is 0, it is indicated that the second type node is not enabled to delay sending a Msg3 message.

In an exemplary embodiment, the Msg3 message includes at least one of the following:

a Radio Resource Control (RRC) Connection Request message, an RRC Connection Reestablishment Request message, and an RRC Connection Reconfiguration Complete message.

In an exemplary embodiment, the RAR information of the second type node includes resource allocation information required for the second type node to send the Msg3 message.

In an exemplary embodiment, an index of the resource allocation information is within a range of 0 to M-1, and an index of each piece of resource allocation information indicates any one or more of the following contents:

a Physical Resource Block (PRB) quantity required for sending a Msg3 message, a PRB index required for sending a Msg3 message, a modulation and coding scheme used for sending a Msg3 message, and a Transport Block Size (TBS) of a Msg3 message.

In an exemplary embodiment, position information of a band occupied by sending the Msg3 message through the second type node is determined by at least one of the following manners:

determining a pre-defined manner, indicating in the RAR information of the second type node, occupying a same band as the random access signaling sent by the second type node, and determining by a band occupied by the random access signaling sent by the second type node.

In an exemplary embodiment, determining a band occupied by the random access signaling sent by the second type node includes:

a mapping relation exists between the band occupied by the random access signaling sent by the second type node and the band occupied by sending the Msg3 message through the second type node, position information of a band occupied by sending the Msg3 message is determined according to the mapping relation, herein the mapping relation is configured by standard default or is sent to the second type node by the first type node.

In an exemplary embodiment, information about a band position where a UE-specific Search Space (USS) of the DCI of the second type node is located is indicated in the RAR information of the second type node.

In an exemplary embodiment, the information about a band position where the USS of the DCI of the second type node is located is reported by the second type node in the Msg3 message.

In an exemplary embodiment, the level of the second type node includes at least one of the following:
a Coverage Enhancement Level (CEL),
a Physical Random Access Channel (PRACH) CEL, and
a PRACH repeated sending level.

In an exemplary embodiment, the first type node is any one of the following equipment:
a macrocell, a microcell, a picocell, a femtocell, a Low Power Node (LPN), and a relay.

In an exemplary embodiment, the second type node is any one of the following equipment:
one or more Human-to-Human (H2H) UEs,
one or more M2M UEs,
one or more Device-to-Device (D2D) UEs, and
one or more MTC UEs.

A node includes:
a response message sending module, configured to send an RAR through a downlink channel, herein the RAR carries one or more pieces of RAR information of a second type node.

In an exemplary embodiment, the node further includes:
a signaling receiving module, configured to receive a random access signaling sent by the second type node.

In an exemplary embodiment, the node is generated in any one of the following equipment:
a macrocell, a microcell, a picocell, a femtocell, an LPN and a relay.

A computer-readable storage medium stores a computer-executable instruction, and the computer-executable instruction is used for executing the method as any one of the above.

The embodiment of the present disclosure provides a method for sending an RAR message and a node. A first type node sends an RAR through a downlink channel, and the RAR carries one or more pieces of RAR information of a second type node. Enhanced design for an RAR is achieved, and the problem about enhanced design for the RAR is solved.

After the drawings and the detailed descriptions are read and understood, other aspects may be understood.

DETAILED DESCRIPTION

Due to enhanced design on a PRACH of an LTE/LTE-A system to ensure that MTC UE can normally access the system, an RAR of the LTE/LTE-A system also needs the enhanced design, thus ensuring that the MTC UE can normally receive the RAR.

To solve the above-mentioned problem, the embodiment of the present disclosure provides a method for sending an RAR message and a node. After receiving a random access signaling sent by a second type node, a first type node sends an RAR through a downlink channel, herein the RAR carries one or more pieces of RAR information of the second type node.

The first type node may be any one of the following equipment:
a macrocell, a microcell, a picocell, a femtocell, an LPN and a relay.

The second type node may be any one of the following equipment:
one or more H2H UEs,
one or more M2M UEs,
one or more D2D UEs, and
one or more MTC UEs.

In the embodiment of the present invention, a scenario where the second type node is an MTC UE is taken as an example. Other types of second type nodes and first type nodes adopt the same implementation principle and will not be repeatedly illustrated.

The present invention will be illustrated hereinbelow with reference to the drawings in detail. It is important to note that embodiments in the present invention and characteristics in the embodiments may be randomly combined with each other under the condition of no conflicts.

Embodiment One

There are MTC UEs in an LTE system, and the MTC UEs may support Coverage Enhancement (CE). In the present embodiment, a PRACH supports three Coverage Enhancement Levels (CELs) totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner.

In the present embodiment, after sending the Preamble on the PRACH according to configuration information of the eNB, UE1 to UE3 need to receive RAR information sent by the eNB, and the RAR information is sent in an RAR.

In the present embodiment, scheduling information of the RAR is contained in DCI and is sent through a PDCCH and/or an EPDCCH.

The DCI includes resource allocation information about RAR information of the MTC UEs of the three CELs in the RAR.

Figure 1:
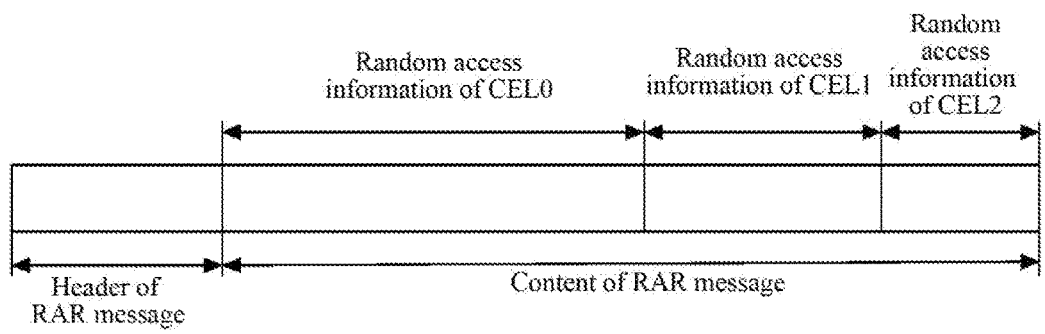
FIG. 1 is a structural diagram of an RAR message provided in Embodiment one of the present disclosure.

In the present embodiment, the resource allocation information indicates that there are five pieces of RAR information of CEL0 in the RAR, and there are three pieces of RAR information of CEL1 in the RAR and there are two pieces of RAR information of CEL2 in the RAR; and moreover, the pieces of RAR information are arranged in the RAR in an ascending order of CELs. In the present embodiment, the RAR information of CEL0 is arranged first, then the RAR information of CEL1, and the last the RAR information of CEL2, as shown in FIG. 1.

UE1 to UE3 determine that its own RAR information is within the range of the RAR according to the resource allocation information, and there is a one-to-one mapping relation between each piece of RAR information and a Preamble index in the RAR information of the same CEL. UE determines a position of its own RAR information according to the Preamble index sent by the UE itself, and decodes the RAR information.

In addition to the present embodiment, the DCI includes resource allocation information about RAR information of the MTC UEs of two of the three CELs in the RAR.

Figure 2:
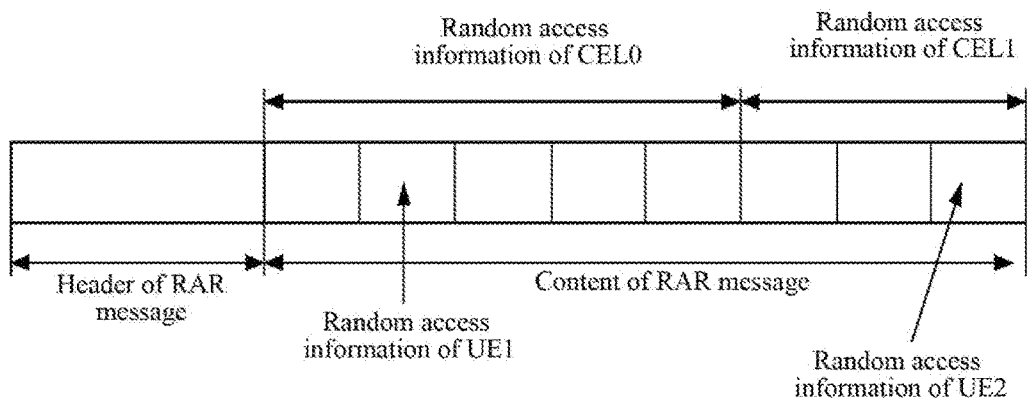
FIG. 2 is a structural diagram of another RAR message provided in Embodiment one of the present disclosure.

In the present embodiment, the resource allocation information firstly includes indexes of two CELs such as CEL0 and CELL. The resource allocation information further includes ratio information (5:3) of RAR information of CEL0 to RAR information of CEL1 in the RAR, so by means of the ratio information, it may be learnt that: there are five pieces of RAR information of CEL0 in the RAR and there are three pieces of RAR information of CEL1 in the RAR (it is supposed that there are eight pieces of RAR information that can be supported in the known RAR totally); and moreover, the pieces of RAR information are arranged in the RAR in an ascending order of CELs. In the present embodiment, the RAR information of CEL0 is first arranged, then the RAR information of CEL1, as shown in FIG. 2.

UE1 and UE2 determine that ranges of their own RAR information in the RAR according to the resource allocation information, and there is a one-to-one mapping relation between each piece of RAR information and a Preamble index in the RAR information of the same CEL. UE determines a position of its own RAR information according to the Preamble index sent by the UE itself, and decodes the RAR information.

Embodiment Two

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner.

In the present embodiment, UE1 sends the Preamble on the PRACH according to configuration information of the eNB, and an index of Preamble is PID=1, and then UE1 needs to receive RAR information sent by the eNB, and the RAR information is sent in an RAR.

Figure 3:
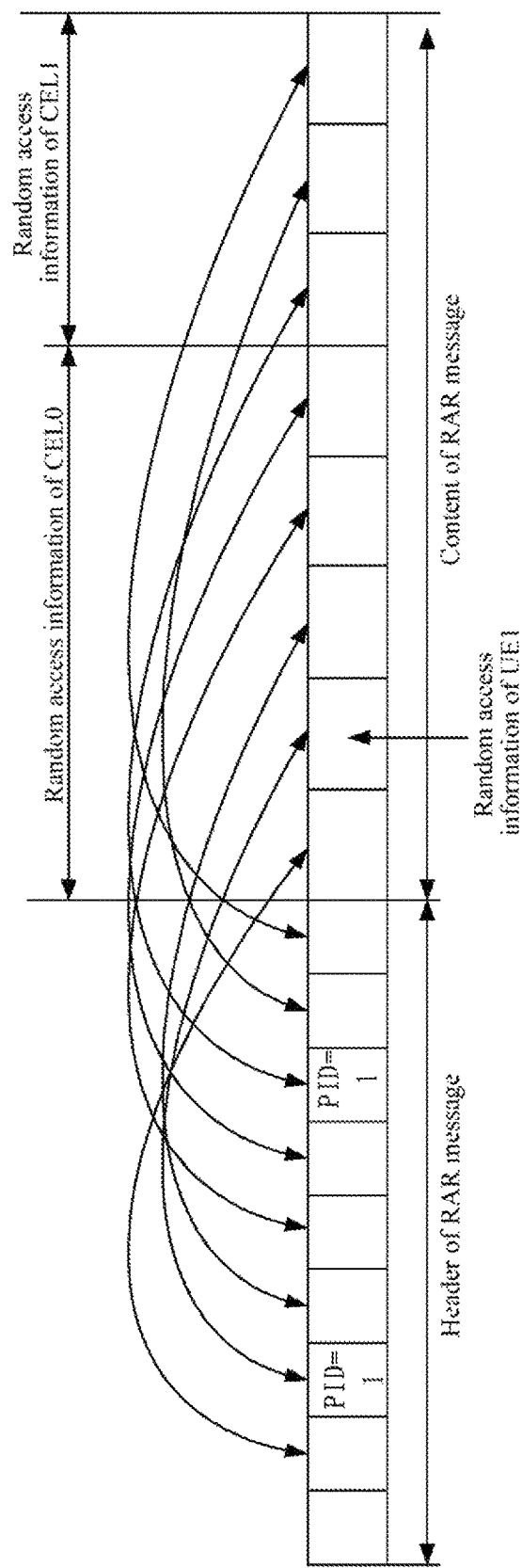
FIG. 3 is a structural diagram of an RAR message according to Embodiment two, Embodiment six, Embodiment seven, Embodiment eight, Embodiment eleven and Embodiment twelve of the present disclosure.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is first arranged, then the RAR information of CEL1, as shown in FIG. 3.

UE1 decodes PID information in a header of the RAR message in sequence, and if finding that there are two pieces of PID=1, UE1 will attempt to decode RAR information corresponding to the two PIDs. The RAR information includes CEL indication information, and then the RAR information with the same CEL as that of the UE1 which is found by UE1 is RAR information sent to UE1 by the eNB.

Embodiment Three

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner.

In the present embodiment, UE1 sends the Preamble on the PRACH according to configuration information of the eNB, and a Preamble index is PID=12, and then UE1 needs to receive RAR information sent by the eNB, and the RAR information is sent in an RAR.

Figure 4:
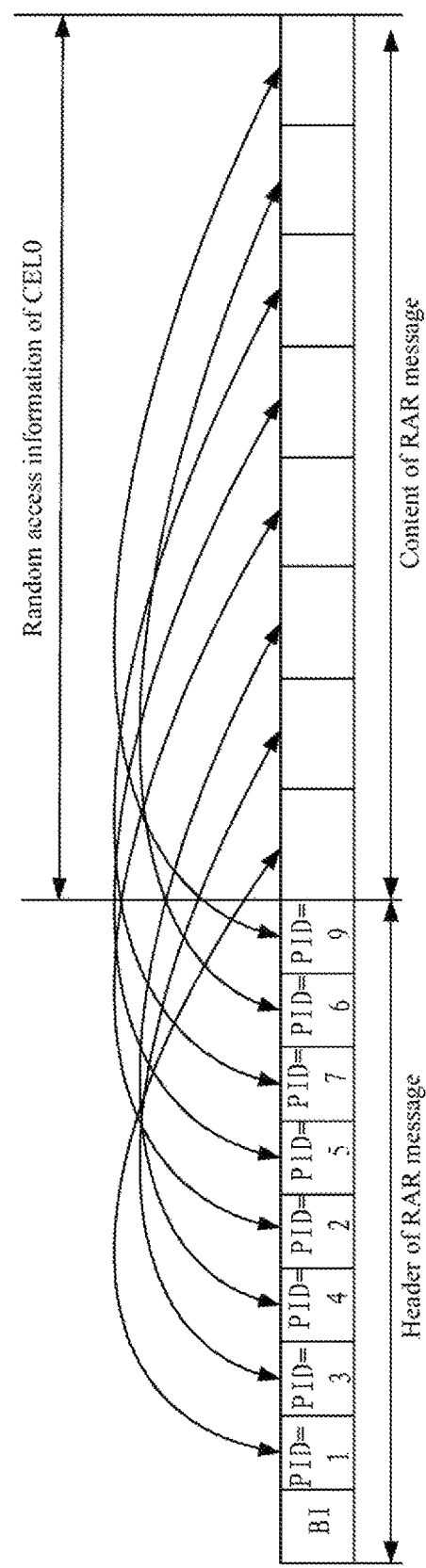
FIG. 4 is a structural diagram of an RAR message according to Embodiment three, Embodiment nine and Embodiment ten of the present disclosure.

In the present embodiment, the RAR only contains eight pieces of RAR information of CEL0, as shown in FIG. 4.

UE1 decodes BI information in a header of the RAR message. In the present embodiment, if learning of BI Index=3, UE1 learns of a first BP (BP1)=30 ms by searching Table 1.

TABLE 1

| Index | Value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

UE1 determines a second BP (BP2) according to the following formula:

$$BP2=BP1 \times A \times B;$$

herein there is a mapping relation between the value of A and a CEL of a UE, as shown in Table 2.

In the present embodiment, CEL of UE1 is CEL0 and the value of A is 1.

TABLE 2

| CEL | Value (ms) |
|-----|------------|
| 0   | 1          |
| 1   | 2          |
| 2   | 3          | herein B is a repetition quantity of sending r Preamble through UE1 at the latest time, or B is a quantity of subframes occupied by sending Preamble through UE1 at the latest time, or B is time corresponding to subframes occupied by sending Preamble through UE1 at the latest time; or B is a repetition quantity of sending Preamble through UE1, or B is a quantity of subframes occupied by sending Preamble through UE1, or B is time corresponding to subframes occupied by sending Preamble through UE1.

UE1 decodes PID information in a header of the RAR message in sequence, and if UE1 does not find PID=12, UE1 needs to re-send the PRACH Preamble, and the sending time is time delayed for T (ms) after an RAR detection window is ended, herein the time T is one time point uniformly and randomly selected by UE1 from 0 to BP2.

In addition to the present embodiment, UE1 may also determine BP2 according to the following formula:

$$BP2=BP1\times A;$$

herein there is a mapping relation between the value of A and a CEL of a UE, as shown in Table 3.

In the present embodiment, the CEL of UE1 is CEL0 and the value of A is 1.

TABLE 3

| CEL | Value (ms) |
|-----|------------|
| 0   | 2          |
| 1   | 4          |
| 2   | 6          |

In addition to the present embodiment,

UE1 may also determine BP2 according to the following formula:

$$BP2=BP1\times B;$$

herein B is a repetition quantity of sending Preamble through UE1 at the latest time, or B is a quantity of subframes occupied by sending Preamble through UE1 at the latest time, or B is time corresponding to subframes occupied by sending Preamble through UE1 at the latest time; or B is a repetition quantity of sending Preamble through UE1, or B is a quantity of subframes occupied by sending Preamble through UE1, or B is time corresponding to subframes occupied by sending Preamble through UE1.

Embodiment Four

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=12, and then UE1 needs to receive RAR information sent by the eNB, and the RAR information is sent in an RAR.

In the present embodiment, each RAR contains only one piece of RAR information of a UE; and if UE1 does not detect RAR information sent to UE1 within a detection time window of the RAR, UE1 needs to re-send the PRACH Preamble. Information associated with the re-sending time of the PRACH Preamble, namely BI information, is sent in SI. After UE1 obtains the BI information, in the present embodiment, if learning of BI Index=3, UE1 learns of BP1=30 ms by searching Table 1.

UE1 obtains the re-sending time T of the PRACH Preamble according to the following rule:

(1) UE1 determines BP2 according to the following formula:

$$BP2=BP1\times B;$$

herein B is a repetition quantity of sending Preamble through UE1 at the latest time, or B is a quantity of subframes occupied by sending Preamble through UE1 at the latest time, or B is time corresponding to subframes occupied by sending Preamble through UE1 at the latest time; or B is a repetition quantity of sending Preamble through UE1, or B is a quantity of subframes occupied by sending Preamble through UE1, or B is time corresponding to subframes occupied by sending Preamble through UE1.

(2) The re-sending time of the PRACH Preamble is delayed for T (ms) after an RAR detection window is ended, herein the time T is one time point uniformly and randomly selected by UE1 from 0 to BP2.

Embodiment Five

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=12, and then UE1 needs to receive RAR information sent by the eNB, and the RAR information is sent in an RAR.

In the present embodiment, each RAR contains only one piece of RAR information of a UE; and if UE1 does not detect RAR information sent to the UE1 within a detection time window of the RAR, UE1 needs to re-send a PRACH Preamble. Information associated with the re-sending time of the PRACH Preamble, namely, backoff indicator (BI), is sent through a message, herein scheduling information of the message is contained in DCI and is sent through a PDCCH and/or an EPDCCH.

The DCI further includes a CRC, and the CRC is scrambled by a BI-RNTI. The scrambling manner is as follows:

$$c_k = (b_k + a_k) \bmod 2 \ k = 0, 1, \ldots, q$$

herein $b_k$ represents a $(k+1)^{th}$ bit in the CRC, and $a_k$ represents a $(k+1)^{th}$ bit in the BI-RNTI, and $c_k$ represents a $(k+1)^{th}$ bit generated after scrambling.

After UE1 obtains the BI information by decoding the message, in the present embodiment, if learning of BI Index=3, UE1 learns of BP1=30 ms by searching Table 1.

UE1 obtains the re-sending time T of the PRACH Preamble according to the following rule:

(1) UE1 determines BP2 according to the following formula:

$$BP2 = BP1 \times B;$$

herein B is a repetition quantity of sending Preamble through UE1 at the latest time, or B is a quantity of subframes occupied by sending Preamble through UE1 at the latest time, or B is time corresponding to subframes occupied by sending Preamble through UE1 at the latest time; or B is a repetition quantity of sending Preamble through UE1, or B is a quantity of subframes occupied by sending Preamble through UE1, or B is time corresponding to subframes occupied by sending Preamble through UE1.

(2) The re-sending time of the PRACH Preamble is delayed for T (ms) after an RAR detection window is ended, herein the time T is one time point uniformly and randomly selected by UE1 from 0 to BP2.

In addition to the present embodiment, the BI information may also be contained in DCI and sent through a PDCCH and/or an EPDCCH.

The DCI further includes a CRC, and the CRC is scrambled by a BI-RNTI. The scrambling manner is as follows:

$$c_k = (b_k + a_k) \bmod 2 \ k = 0, 1, \ldots, q$$

herein $b_k$ represents a $(k+1)^{th}$ bit in the CRC, and $a_k$ represents a $(k+1)^{th}$ bit in the BI-RNTI, and $c_k$ represents a $(k+1)^{th}$ bit generated after scrambling.

Embodiment Six

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=1, and then UE1 needs to receive RAR information sent by the eNB, and the RAR information is sent in an RAR.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is arranged first, then the RAR information of CEL1, as shown in FIG. 3.

UE1 decodes PID information in a header of an RAR message in sequence, and if finding that there are two pieces of PID=1, UE1 will attempt to decode RAR information corresponding to the two PIDs. The RAR information includes CEL indication information, then the RAR information with the same CEL as that of the UE1 which is found by UE1 is RAR information sent to UE1 by the eNB.

UE1 decodes the RAR information sent to UE1 by the eNB to obtain UL Delay information; and UE1 determines, according to the UL Delay information, whether to delay sending a Msg3 message; and in the present embodiment, '1' represents delaying for sending, and '0' represents non-delaying for sending.

When the UL Delay information is indicative of delaying sending the Msg3 message, UE1 determines a delay time T for sending the Msg3 message according to the following expression:

$$T = D,$$

herein there is a mapping relation between the value of D and a CEL of a UE; or the value of D is at least determined according to a repetition quantity of sending PUSCH of the UE.

The Msg3 message includes at least one of the following:
an RRC Connection Request message,
an RRC Connection Reestablishment Request message, and
an RRC Connection Reconfiguration Complete message.

Embodiment Seven

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=1, and then UE1 needs to receive RAR information sent by the eNB, and the RAR information is sent in an RAR.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is arranged first, then the RAR information of CEL1, as shown in FIG. 3.

UE1 decodes PID information in a header of an RAR message in sequence, and if finding that there are two pieces of PID=1, UE1 will attempt to decode RAR information corresponding to the two PIDs. The RAR information includes CEL indication information, so the RAR information with the same CEL as that of the UE1 which is found by UE1 is RAR information sent to UE1 by the eNB.

UE1 decodes the RAR information sent to UE1 by the eNB to obtain UL Delay information; UE1 determines, according to the UL Delay information, whether to delay sending a Msg3 message; and in the present embodiment, '1' represents delaying for sending, and '0' represents non-delaying for sending.

In the present embodiment, UL Delay=0 represents non-delaying for sending.

UE1 decodes the RAR information sent to UE1 by the eNB to obtain resource allocation information required by the Msg3 message.

In the present embodiment, resources capable of sending the Msg3 message through UE1 are distributed on one or more narrowbands.

An index of the resource allocation information is within the range of 0 to M-1, and is configured by system default, and the index of each piece of resource allocation information may indicate at least one of the following:

narrowband information of sending a Msg3 message,
a PRB quantity required for sending a Msg3 message,
a PRB index required for sending a Msg3 message,
a modulation and coding scheme used for sending a Msg3 message, and
a TBS of a Msg3 message.

The Msg3 message includes at least one of the following:
an RRC Connection Request message,
an RRC Connection Reestablishment Request message, and
an RRC Connection Reconfiguration Complete message.

Embodiment Eight

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner.

In the present embodiment, UE1 sends the Preamble on the PRACH according to configuration information of the eNB, and a Preamble index is PID=1, and then UE1 needs to receive RAR information sent by the eNB, and the RAR information is sent in an RAR.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is arranged first, then the RAR information of CEL1, as shown in FIG. 3.

UE1 decodes PID information in a header of an RAR message in sequence, and if finding that there are two pieces of PID=1, UE1 will attempt to decode RAR information corresponding to the two PIDs. The RAR information includes CEL indication information, then the RAR information with the same CEL as that of the UE1 which is found by UE1 is RAR information sent to UE1 by the eNB.

UE1 decodes the RAR information sent to UE1 by the eNB to obtain UL Delay information; UE1 determines, according to the UL Delay information, whether to delay sending a Msg3 message; and in the present embodiment, '1' represents delaying for sending, and '0' represents non-delaying for sending.

In the present embodiment, UL Delay=0 represents non-delaying for sending.

UE1 decodes the RAR information sent to UE1 by the eNB to obtain resource allocation information required by the Msg3 message.

The value range of the index of the resource allocation information is 0-63 and is configured by system default, and there is a mapping relation between an index of each piece of resource allocation information and a combination of $I_{TBS}$ and $N_{PRB}$, herein $N_{PRB}$ is the quantity of PRBs allocated to a Msg3 message, and $I_{TBS}$ is a variable associated with a TBS of a Msg3 message. In the present embodiment, the index of the resource application information is 3, and it can be learnt from a mapping relation table, table 4, between an index of resource allocation information and a combination of $I_{TBS}$ and $N_{PRB}$, that $I_{TBS}$=0 and $N_{PRB}$=4.

TABLE 4

| $I_{TBS}$ | $N_{PRB}$ | | | | | |
|---|---|---|---|---|---|---|
| | 1 | 2 | 3 | 4 | 5 | 6 |
| 0 | 0 | 1 | 2 | 3 | 4 | 5 |
| 1 | 6 | 7 | 8 | 9 | 10 | 11 |
| 2 | 12 | 13 | 14 | 15 | 16 | 17 |
| 3 | 18 | 19 | 20 | 21 | 22 | 23 |
| 4 | 24 | 25 | 26 | 27 | 28 | 29 |
| 5 | 30 | 31 | 32 | 33 | 34 | 35 |
| 6 | | 36 | 37 | 38 | 39 | 40 |
| 7 | 41 | 42 | 43 | 44 | 45 | 46 |
| 8 | 47 | 48 | 49 | 50 | 51 | 52 |
| 9 | 53 | 54 | 55 | 56 | 57 | 58 |
| 10 | 59 | 60 | 61 | 62 | 63 | |

In the present embodiment, according to $I_{TBS}$=0 and $N_{PRB}$=4, it can be learnt from a mapping relation table, table 5, between a TBS and a combination of $I_{TBS}$ and $N_{PRB}$ that a TBS of a Msg3 message is equal to 88 bits.

TABLE 5

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | |

In the present embodiment, index information of four PRBs required for sending a Msg3 message is indicated by the eNB.

In the present embodiment, a modulation and coding scheme used for sending a Msg3 message is configured by system default.

The Msg3 message includes at least one of the following:
an RRC Connection Request message,
an RRC Connection Reestablishment Request message, and
an RRC Connection Reconfiguration Complete message.

Embodiment Nine

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=12, and then UE1 needs to receive RAR information sent by the eNB, and the RAR information is sent in an RAR.

In the present embodiment, the RAR only contains eight pieces of RAR information of CEL0, as shown in FIG. 4.

UE1 decodes BI information in a header of a message. In the present embodiment, UE1 learns of BI Index=3, and a mapping table between available BI information and BP1 of CEL0 is a sub-table of Table 1, namely Table 7 in the present embodiment.

TABLE 6

| Index | Value (ms) |
|---|---|
| 0 | 0 |
| 1 | 10 |
| 2 | 20 |
| 3 | 30 |
| 4 | 40 |
| 5 | 60 |

UE1 learns of BP1=30 ms by means of BI Index=3 and by searching Table 6.

UE1 determines Backoff Time (BT) according to the following formula:

$$BT = \text{Backoff Parameter} \times A \times B,$$

herein there is a mapping relation between the value of A and a CEL of the UE, as shown in Table 2.

In the present embodiment, if the CEL of the UE is CEL0, the value of A is 1.

Herein, B is a repetition quantity of sending Preamble through UE1 at the latest time, or B is a quantity of subframes occupied by sending Preamble through UE1 at the latest time, or B is time corresponding to subframes occupied by sending Preamble through UE1 at the latest time; or B is a repetition quantity of sending Preamble through UE1, or B is a quantity of subframes occupied by sending Preamble through UE1, or B is time corresponding to subframes occupied by sending Preamble through UE1.

UE1 decodes PID information in a header of an RAR message in sequence, and if UE1 does not find PID=12, UE1 needs to re-send a PRACH Preamble, and the sending time is delayed for T (ms) after an RAR detection window is ended, herein the time T is one time point uniformly and randomly selected by UE1 from 0 to BT.

In addition to the present embodiment,
the sub-table of Table 1 may also be as shown in Table 7.

TABLE 7

| Index | Value (ms) |
|---|---|
| 0 | 0 |
| 1 | 40 |
| 2 | 80 |
| 3 | 120 |
| 4 | 240 |
| 5 | 480 |
| 6 | 960 |
| 7 | 1920 |

UE1 learns of BP1=120 ms by means of BI Index=3 and by searching Table 7.

Embodiment Ten

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=12, and then UE1 needs to receive RAR information sent by the eNB, and the RAR information is sent in an RAR.

In the present embodiment, the RAR only contains eight pieces of RAR information of CEL0, as shown in FIG. 4.

In the present embodiment, a mapping table between a BI index and a BP is as shown in Table 8, Table 9 and Table 10, corresponding to CEL0, CEL1 and CEL2 respectively.

UE1 decodes BI information in a header of a message. In the present embodiment, if learning of BI Index=3, UE1 learns of BP=30 ms by searching Table 9.

TABLE 8

| Index | Value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

TABLE 9

| Index | Value (ms) |
|---|---|
| 0 | 0 |
| 1 | 50 |
| 2 | 100 |
| 3 | 150 |

TABLE 9-continued

| Index | Value (ms) |
|---|---|
| 4 | 200 |
| 5 | 300 |
| 6 | 400 |
| 7 | 600 |
| 8 | 900 |
| 9 | 1200 |
| 10 | 1600 |
| 11 | 2400 |
| 12 | 4800 |
| 13 | Reserved |
| 14 | Reserved |
| 15 | Reserved |

TABLE 10

| Index | Value (ms) |
|---|---|
| 0 | 0 |
| 1 | 100 |
| 2 | 200 |
| 3 | 300 |
| 4 | 400 |
| 5 | 600 |
| 6 | 800 |
| 7 | 1200 |
| 8 | 1600 |
| 9 | 2400 |
| 10 | 3200 |
| 11 | 4800 |
| 12 | 9600 |
| 13 | Reserved |
| 14 | Reserved |
| 15 | Reserved |

UE1 decodes PID information in a header of an RAR message in sequence, and if UE1 does not find PID=12, UE1 needs to re-send a PRACH Preamble, and the sending time is delayed for T (ms) after an RAR detection window is ended, herein the time T is one time point uniformly and randomly selected by UE1 from 0 to BP.

Embodiment Eleven

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=1, and then UE1 needs to receive RAR information sent by the eNB, and the RAR information is sent in an RAR.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is arranged first, then the RAR information of CEL1, as shown in FIG. 3.

UE1 decodes PID information in a header of the RAR message in sequence, and if finding that there are two pieces of PID=1, UE1 will attempt to decode RAR information corresponding to the two PIDs. The RAR information includes CEL indication information, then the RAR information with the same CEL as that of the UE1 which is found by UE1 is RAR information sent to UE1 by the eNB.

UE1 decodes the RAR information sent to UE1 by the eNB to obtain UL Delay information. That UE1 determines, according to the UL Delay information, whether to delay sending a Msg3 message includes at least one of the following steps:

a mapping table between UL Delay information and a sending delay time T is pre-defined, herein mapping tables corresponding to different levels are different; and UE1 selects a corresponding mapping table according to CEL information, and then obtains the sending delay time T in the selected mapping table according to the UL Delay information; and when the obtained sending delay time T is 0, it is indicated that the UE is not enabled to delay sending a Msg3 message.

In the present embodiment, the UE selects a corresponding mapping table, such as Table 11, according to the CEL of the UE, namely CEL0.

TABLE 11

| Index | Value (ms) |
|---|---|
| 0 | 0 |
| 1 | 2 |
| 2 | 4 |
| 3 | 8 |

In the present embodiment, UL Delay information is '2', then through Table 11, UE1 may learn that the sending delay time T of the Msg3 message is equal to 4 ms.

UE1 sends the Msg3 message on a first available uplink subframe delayed for 4 ms after a first subframe capable of sending the Msg3 message.

The Msg3 message includes at least one of the following:
an RRC Connection Request message,
an RRC Connection Reestablishment Request message, and
an RRC Connection Reconfiguration Complete message.

Embodiment Twelve

There are MTC UEs in an LTE system, and the MTC UEs may support CE. In the present embodiment, a PRACH supports three CELs totally, namely CEL0, CEL1 and CEL2. Moreover, UE1 is an MTC UE of CEL0, and UE2 is an MTC UE of CEL1, and UE3 is an MTC UE of CEL2. An eNB allocates PRACH resources to the MTC UE of each CEL, and the resources include a random access Preamble used for sending a random access signaling, and a subframe and PRB used for sending the Preamble. The PRACH resources can be allocated to the MTC UEs in a time division multiplexing and/or frequency division multiplexing and/or code division multiplexing manner In the present embodiment, UE1 sends the Preamble on the PRACH according to configuration information of the eNB, and a Preamble index is PID=1, and then UE1 needs to receive RAR information sent by the eNB, and the RAR information is sent in an RAR.

In the present embodiment, there are five pieces of RAR information of CEL0 in the RAR and there are three pieces of RAR information of CEL1 in the RAR; and moreover, the pieces of RAR information are arranged in the RAR in an ascending order of CELs. In the present embodiment, the RAR information of CEL0 is arranged first, then the RAR information of CEL1, as shown in FIG. 3.

UE1 decodes PID information in a header of an RAR message in sequence, and if finding that there are two pieces of PID=1, UE1 will attempt to decode RAR information corresponding to the two PIDs. The RAR information includes CEL indication information, then the RAR information with the same CEL as that of the UE1 which is found by UE1 is RAR information sent to UE1 by the eNB.

UE1 decodes the RAR information sent to UE1 by the eNB to obtain UL Delay information; UE1 determines, according to the UL Delay information, whether to delay sending a Msg3 message; and in the present embodiment, '1' represents delaying for sending, and '0' represents non-delaying for sending.

In the present embodiment, UL Delay=0 represents non-delaying for sending. UE1 decodes the RAR information sent to UE1 by the eNB to obtain resource allocation information required by the Msg3 message.

The value range of the index of the resource allocation information is within the range of 0 to M-1, and is configured by system default, and the index of each piece of resource allocation information may indicate at least one of the following:

a PRB quantity required for sending a Msg3 message,
a PRB index required for sending a Msg3 message,
a modulation and coding scheme used for sending a Msg3 message, and
a TBS of a Msg3 message.

The Msg3 message includes at least one of the following:
an RRC Connection Request message,
an RRC Connection Reestablishment Request message, and
an RRC Connection Reconfiguration Complete message.

In the present embodiment, resources capable of sending the Msg3 message through UE1 are distributed on one or more narrowbands.

Position information of the Narrowband occupied by sending a Msg3 message through UE1 is determined by at least one of the following:

indicating in RAR information of UE1,
occupying the same narrowband as a Preamble sent by UE1, and
determining by a narrowband occupied by a Preamble sent by UE1.

Herein, determining a narrowband occupied by sending a Msg3 message through UE1 by means of a narrowband occupied by sending a Preamble through UE1 includes the manners as follows:

Assumed that an index of the narrowband occupied by sending the Preamble through UE1 is Index A, then an index of the narrowband occupied by sending the Msg3 message through UE1 is Index (A+K), herein K is configured by standard default or configured by the eNB.

In the present embodiment, the information about the narrowband position where a USS of DCI of UE1 is located is reported in the Msg3 message sent by UE1.

In addition to the present embodiment, the information about the narrowband position where the USS of the DCI of UE1 is located may also be indicated in the RAR information sent to UE1 by the eNB.

Embodiment Thirteen

Figure 5:
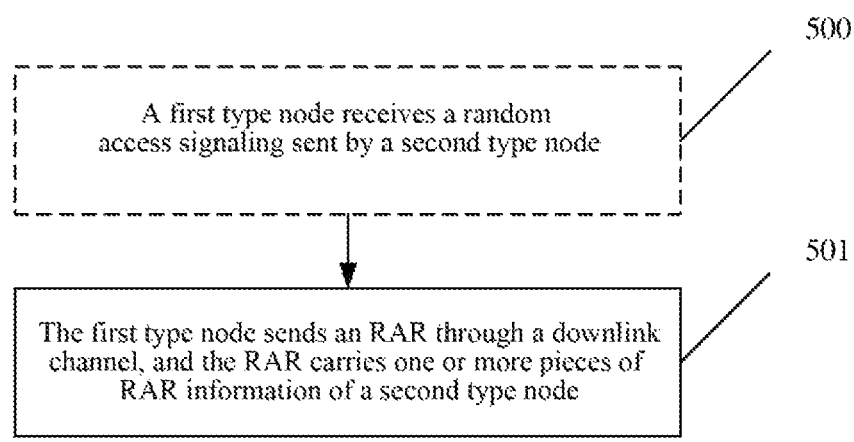
FIG. 5 is a flowchart of a method for sending an RAR message provided in Embodiment thirteen of the present disclosure.

As shown in FIG. 5, the embodiment of the present disclosure provides a method for sending an RAR message, which includes the steps as follows.

In step 501, a first type node sends an RAR through a downlink channel, herein the RAR carries one or more pieces of RAR information of a second type node.

Before the step 501, the method further includes that: in step 500, the first type node receives a random access signaling sent by the second type node.

In an exemplary embodiment, scheduling information of the RAR is contained in DCI and is sent through a PDCCH and/or an EPDCCH.

In an exemplary embodiment, the scheduling information of the RAR includes resource allocation information about RAR information of N levels of second type nodes in the RAR, herein N is greater than or equal to 1.

In an exemplary embodiment, the resource allocation information is indicated by first index information, and the first index information is expressed by K bits, herein K is greater than or equal to 1.

In an exemplary embodiment, any one or more pieces of the following information are indicated through the first index information:

level quantity information of the second type nodes to which RAR information sent in the RAR belongs,
level index information of the second type nodes to which RAR information sent in the RAR belongs,
quantity information of RAR information supported and sent to each level of second type node in the RAR, and
ratio information of the quantity of RAR information supported and sent to each level of second type node in the RAR to a quantity of RAR information that can be totally supported in the RAR.

In addition, the RAR information of the second type node includes level information of the second type node.

In an exemplary embodiment, BI index information is sent in the RAR.

In an exemplary embodiment, the second type node obtains a first BP according to the BI index information, and a mapping relation between the BI index information and the first BP is configured by standard default.

In an exemplary embodiment, the second type node determines a second BP according to any one of the following expressions:

second BP=first BP×$A$×$B$, second BP=first BP×$A$, second BP=first BP×$B$, and second BP=first BP, herein there is a mapping relation between the value of A and the level of the second type node, and B is a repetition quantity of sending Preamble through the second type node at the latest time, or a quantity of subframes occupied by sending Preamble through the second type node at the latest time, or time corresponding to subframes occupied by sending Preamble through the second type node at the latest time, or a repetition quantity of sending Preamble through the second type node, or a quantity of subframes occupied by sending Preamble through the second type node, or time corresponding to subframes occupied by sending Preamble through the second type node.

In an exemplary embodiment, when the RAR carries only one piece of RAR information of the second type node, the BI index information is indicated in SI.

In an exemplary embodiment, when the RAR carries only one piece of RAR information of the second type node, the BI index information is sent by the first type node through a message, herein scheduling information of the message is contained in DCI and sent through a PDCCH and/or an EPDCCH.

In an exemplary embodiment, the DCI further includes a CRC, and the CRC is scrambled by a BI-RNTI.

In an exemplary embodiment, when the RAR carries only one piece of RAR information of the second type node, the BI index information is contained in DCI and sent through a PDCCH and/or an EPDCCH.

In an exemplary embodiment, the DCI further includes a CRC, and the CRC is scrambled by a BI-RNTI.

In an exemplary embodiment,
the BI index information is sent in the RAR.

In an exemplary embodiment, a mapping table between BI index information and a BP may also be pre-defined, and mapping tables corresponding to different levels are different. In this case, the second type node selects a corresponding mapping table according to the level information, and obtains a corresponding BP in the selected mapping table according to the BI index information.

In an exemplary embodiment, mapping relations between BI index information and BPs of different levels of second type nodes may also be pre-defined in the same mapping table. In this case, value ranges of the BI index information of the different levels of second type nodes are informed by the first type node or determined in a pre-defined manner.

In an exemplary embodiment, there is an intersection between the value ranges of the BI index information of the different levels of second type nodes.

In addition, the RAR information of the second type node includes UL Delay information of the second type node, and the method further includes:
the second type node determines, according to the UL Delay information, whether to delay sending a Msg3 message.

In an exemplary embodiment, when the UL Delay information is indicative of delaying sending the Msg3 message, the second type node determines a delay time T for sending the Msg3 message according to the following expression:

$$T=D,$$

herein there is a mapping relation between the value of D and the level of the second type node, and the value of D is determined according to a repetition quantity of sending PUSCH of the second type node, and the measuring unit of D is Subframe or Frame.

In an exemplary embodiment, that the second type node determines a delay time T for sending the Msg3 message according to the UL Delay information includes that:
a mapping table between UL Delay information and a sending delay time T is pre-defined, herein mapping tables corresponding to different levels are different;
the second type node selects a corresponding mapping table according to the level information, and then obtains the sending delay time T in the selected mapping table according to the UL Delay information.

In an exemplary embodiment, when the obtained sending delay time T is 0, it is indicated that the second type node is not enabled to delay sending a Msg3 message.

In an exemplary embodiment, the Msg3 message includes at least one of the following:
an RRC Connection Request message,
an RRC Connection Reestablishment Request message, and
an RRC Connection Reconfiguration Complete message.

In an exemplary embodiment, the RAR information of the second type node includes resource allocation information required for the second type node to send the Msg3 message.

In an exemplary embodiment, an index of the resource allocation information is within the range of 0 to M-1, and the index of each piece of resource allocation information indicates any one or more of the following contents:
a PRB quantity required for sending a Msg3 message,
a PRB index required for sending a Msg3 message,
a modulation and coding scheme used for sending a Msg3 message, and
a TBS of a Msg3 message.

In an exemplary embodiment, position information of a band occupied by sending the Msg3 message through the second type node is determined by at least one of the following manners:
determining in a pre-defined manner,
indicating in the RAR information of the second type node,
occupying the same band as the random access signaling sent by the second type node, and
determining by a band occupied by the random access signaling sent by the second type node.

In an exemplary embodiment, determining by the band occupied by the random access signaling sent by the second type node includes:
there is a mapping relation between the band occupied by the random access signaling sent by the second type node and a band occupied by sending the Msg3 message through the second type node, and position information of the band occupied by sending the Msg3 message is determined according to the mapping relation, and the mapping relation is configured by standard default or sent to the second type node by the first type node.

In addition, information about the band position where a USS of the DCI of the second type node is located is indicated in the RAR information of the second type node.

In an exemplary embodiment, the information about the band position where the USS of the DCI of the second type node is located is reported by the second type node in the Msg3 message.

In an exemplary embodiment, the level of the second type node involved in the embodiment of the present disclosure includes at least one of the following:
a CEL,
a PRACH CEL, and
a PRACH repeated sending level.

The first type node is any one of the following equipment:
a macrocell, a microcell, a picocell, a femtocell, an LPN and a relay.

The second type node is any one of the following equipment:
one or more H2H UEs,
one or more M2M UEs,
one or more D2D UEs, and
one or more MTC UEs.

Embodiment Fourteen

Figure 6:
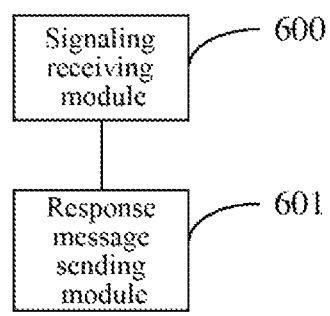
FIG. 6 is a structural diagram of a node provided in Embodiment fourteen of the present disclosure.

The embodiment of the present disclosure provides a node. The structure of the node is as shown in FIG. 6. The node includes:
a response message sending module 601, configured to send an RAR through a downlink channel, herein the RAR carries one or more pieces of RAR information of a second type node.

In an exemplary embodiment, the node further includes:
a signaling receiving module 600, configured to receive a random access signaling sent by the second type node.

The flow of completing sending of an RAR by using the above-mentioned node as a first type node refers to Embodiments one to thirteen of the present disclosure.

The above-mentioned node may be integrated in any one of the following equipment:
a macrocell, a microcell, a picocell, a femtocell, an LPN and a relay.

The embodiment of the present disclosure provides a method for sending an RAR message and a node. A first type node sends an RAR through a downlink channel, and the RAR carries one or more pieces of RAR information of a second type node. Enhanced design for an RAR is achieved, and the problem about enhanced design for the RAR is solved.

Those ordinary skilled in the art can understand that all or some of the steps of the above-mentioned embodiments may be implemented by using a computer program flow. The computer program may be stored in a computer-readable storage medium. The computer program is executed on a corresponding hardware platform (such as system, equipment, device and apparatus, etc.). During execution, the computer program includes one of the steps of the method embodiment or a combination thereof.

In an exemplary embodiment, all or some of the steps of the above-mentioned embodiments may also be implemented by using an integrated circuit. These steps may be manufactured into individual integrated circuit modules respectively, or a plurality of modules or steps therein are manufactured into a single integrated circuit module.

The device/functional module/functional unit in the above-mentioned embodiments may be implemented by using a general computation device. They may be centralized on a single computation device or may be distributed on a network composed of a plurality of computation devices.

When the device/functional module/functional unit in the above-mentioned embodiments is implemented in a form of a software function module and is sold or used as an independent product, it may also be stored in a computer-readable storage medium. The above-mentioned computer-readable storage medium may be a read-only memory, a magnetic disk or an optical disk or the like.

INDUSTRIAL APPLICABILITY

By means of the embodiments of the present disclosure, enhanced design for an RAR is achieved, and the problem about enhanced design for the RAR is solved.

What we claim is:

1. A method for sending a Random Access Response, RAR, message, comprising:
    sending, by a first type node, an RAR message through a downlink channel, wherein the RAR carries one or more pieces of RAR information of a second type node;
    wherein the RAR information of the second type node comprises resource allocation information required for the second type node to send a Msg3 message; and
    wherein position information of a band occupied by sending the Msg3 message through the second type node is determined by at least one of the following manners:
    determining in a pre-defined manner,
    indicating in the RAR information of the second type node,
    occupying a same band as a random access signaling sent by the second type node, and
    determining by a band occupied by the random access signaling sent by the second type node; the method further comprising: containing scheduling information of the RAR in Downlink Control Information, DCI, and sending the scheduling information of the RAR through a Physical Downlink Control Channel, PDCCH, and/or an Enhanced PDCCH, EPDCCH, wherein
    the scheduling information of the RAR comprises resource allocation information about RAR information of N levels of second type nodes in the RAR, and N is greater than or equal to 1;
    and
    wherein the resource allocation information is indicated by first index information, and the first index information is expressed by K bits, wherein K is greater than or equal to 1; and
    any one or more pieces of the following information are indicated through the first index information:
    level quantity information of the second type nodes to which RAR information sent in the RAR belongs,
    level index information of the second type nodes to which RAR information sent in the RAR belongs,
    quantity information of RAR information supported and sent to each level of second type node in the RAR, and
    ratio information of the quantity of RAR information supported and sent to each level of second type node in the RAR to a quantity of RAR information that can be totally supported in the RAR.

2. The method for sending an RAR message according to claim 1, wherein before the step of sending, by a first type node, an RAR message through a downlink channel, the method further comprises:
    receiving, by the first type node, a random access signaling sent by the second type node.

3. The method for sending an RAR message according to claim 1, wherein
    the RAR information of the second type node comprises level information of the second type node.

4. The method for sending an RAR message according to claim 1, further comprising:
    sending, by the first type node, Backoff Indicator, BI, index information to the second type node.

5. The method for sending an RAR message according to claim 4, wherein
    the BI index information is sent in the RAR.

6. The method for sending an RAR message according to claim 5, further comprising: obtaining, by the second type node, a first Backoff Parameter, BP, according to the BI index information, wherein a mapping relation between the BI index information and the first BP is configured by standard default; and
    determining, by the second type node, a second BP according to any one of the following expressions:

second BP=first BP×$A$×$B$, second BP=first BP×$A$, second BP=first BP×$B$, and second BP=first BP, wherein there is a mapping relation between a value of A and a level of the second type node, and B is a repetition quantity of sending Random Access Preamble through the second type node at a latest time, or a quantity of subframes occupied by sending Random Access Preamble through the second type node at the latest time, or time corresponding to subframes occupied by sending Random Access Preamble through the second type node at the latest time, or a repetition quantity of sending Random Access Preamble by the second type node, or a quantity of subframes occupied by sending Random Access Preamble through the second type node, or time corresponding to subframes occupied by sending Random Access Preamble through the second type node.

7. The method for sending an RAR message according to claim 4, wherein when the RAR carries only one piece of RAR information of the second type node, and the BI index information is indicated in System Information, SI.

8. The method for sending an RAR message according to claim 4, wherein the RAR carriers only one piece of RAR information of the second type node;
   wherein the BI index information is sent by the first type node through a message, and scheduling information of the message is contained in Downlink Control Information, DCI, and sent through a Physical Downlink Control Channel, PDCCH, and/or an Enhanced PDCCH, EPDCCH; and
   the DCI further comprises a Cyclic Redundancy Check, CRC, and the CRC is scrambled by a BI Radio Network Temporary Identity, BI-RNTI;
   or
   the BI index information is contained in Downlink Control Information, DCI, and sent through a Physical Downlink Control Channel, PDCCH, and/or an Enhanced PDCCH, EPDCCH; and
   the DCI further comprises a Cyclic Redundancy Check, CRC, and the CRC is scrambled by a BI Radio Network Temporary Identity, BI-RNTI.

9. The method for sending an RAR message according to claim 5, further comprising:
   pre-defining a mapping table between BI index information and a Backoff Parameter, BP, wherein mapping tables corresponding to different levels are different; and
   selecting, by the second type node, a corresponding mapping table according to level information, and obtaining a corresponding BP in the selected mapping table according to the BI index information; or,
   wherein mapping relations between BI index information and BPs of different levels of second type nodes are pre-defined in a same mapping table; and value ranges of BI index information of the different levels of second type nodes are informed by the first type node or determined in a pre-defined manner; and there is an intersection between the value ranges of the BI index information of the different levels of second type nodes.

10. The method for sending an RAR message according to claim 1, wherein the RAR information of the second type node comprises uplink delay information of the second type node, and the method further comprises:
    determining, by the second type node according to the uplink delay information, whether to delay sending the Msg3 message;
    and
    wherein the Msg3 message at least comprises one of the following:
    a Radio Resource Control, RRC, Connection Request message,
    an RRC Connection Reestablishment Request message, and
    an RRC Connection Reconfiguration Complete message; and
    when the uplink delay information is indicative of delaying sending the Msg3 message, the second type node determining delay time T for sending the Msg3 message according to the following expression:

$T=D,$ wherein there is a mapping relation between a value of D and a level of the second type node, and the value of D is determined according to a repetition quantity of sending Physical Uplink Shared Channel, PUSCH, of the second type node, and the measuring unit of D is Subframe or Frame; or,
    pre-defining a mapping table between the uplink delay information and sending delay time T, wherein mapping tables corresponding to different levels are different; and
    selecting, by the second type node, a corresponding mapping table according to the level information, and obtaining the sending delay time T in the selected mapping table according to the uplink delay information; and when the sending delay time T obtained by the second type node is 0, indicating that the second type node is not enabled to delay sending the Msg3 message.

11. The method for sending an RAR message according to claim 1, wherein an index of the resource allocation information is within a range of 0 to M-1, and an index of each piece of resource allocation information indicates any one or more of the following contents:
    a Physical Resource Block, PRB, quantity required for sending the Msg3 message,
    a PRB index required for sending the Msg3 message,
    a modulation and coding scheme used for sending the Msg3 message, and
    a Transport Block Size, TBS, of the Msg3 message.

12. The method for sending an RAR message according to claim 1, wherein the determining a band occupied by the random access signaling sent by the second type node comprises:
    having a mapping relation between the band occupied by the random access signaling sent by the second type node and the band occupied by sending the Msg3 message through the second type node, determining the position information of the band occupied by sending the Msg3 message according to the mapping relation, wherein the mapping relation is configured by standard default or is sent to the second type node by the first type node.

13. The method for sending an RAR message according to claim 1, wherein information about a band position where a UE-specific Search Space, USS, of Downlink Control Information, DCI, of the second type node is located is indicated in the RAR information of the second type node;
    or
    wherein the information about the band position where the USS of the DCI of the second type node is located is reported by the second type node in the Msg3 message.

14. The method for sending an RAR message according to claim 1, wherein the level of the second type node comprises at least one of the following:
    a Coverage Enhancement Level, CEL,
    a Physical Random Access Channel, PRACH, CEL, and
    a PRACH repeated sending level.

15. The method for sending an RAR message according to claim 1, wherein the first type node is any one of the following equipment:
- a macrocell, a microcell, a picocell, a femtocell, a Low Power Node, LPN, and a relay; and the second type node is any one of the following equipment:
- one or more Human-to-Human, H2H, User Equipment, UEs,
- one or more Machine-to-Machine, M2M, UEs,
- one or more Device-to-Device, D2D, UEs, and
- one or more Machine Type Communication, MTC, UEs.

16. A node, comprising:
- a response message sending module configured to, send a Random Access Response, RAR, through a downlink channel, wherein the RAR carries one or more pieces of RAR information of a second type node; wherein the RAR information of the second type node comprises resource allocation information required for the second type node to send a Msg3 message; and
- wherein position information of a band occupied by sending the Msg3 message through the second type node is determined by at least one of the following manners:
- determining in a pre-defined manner,
- indicating in the RAR information of the second type node,
- occupying a same band as a random access signaling sent by the second type node, and
- determining by a band occupied by the random access signaling sent by the second type node; the response message sending module is further configured to: contain scheduling information of the RAR in Downlink Control Information, DCI, and send the scheduling information of the RAR through a Physical Downlink Control Channel, PDCCH, and/or an Enhanced PDCCH, EPDCCH, wherein the scheduling information of the RAR comprises resource allocation information about RAR information of N levels of second type nodes in the RAR, and N is greater than or equal to 1;
and
wherein the resource allocation information is indicated by first index information, and the first index information is expressed by K bits, wherein K is greater than or equal to 1; and
1; any one or more pieces of the following information are indicated through the first index information:
- level quantity information of the second type nodes to which RAR information sent in the RAR belongs,
- level index information of the second type nodes to which RAR information sent in the RAR belongs,
- quantity information of RAR information supported and sent to each level of second type node in the RAR, and
- ratio information of the quantity of RAR information supported and sent to each level of second type node in the RAR to a quantity of RAR information that can be totally supported in the RAR.

17. A computer-readable storage medium in which a computer-executable instruction is stored, wherein the computer-executable instruction is used for executing the method according to claim 1.

18. The method for sending an RAR message according to claim 3, wherein the level of the second type node comprises at least one of the following:
- a Coverage Enhancement Level, CEL,
- a Physical Random Access Channel, PRACH, CEL, and
- a PRACH repeated sending level.

19. The method for sending an RAR message according to claim 5, wherein the level of the second type node comprises at least one of the following:
- a Coverage Enhancement Level, CEL,
- a Physical Random Access Channel, PRACH, CEL, and
- a PRACH repeated sending level.

* * * * *